US006534575B2

(12) United States Patent
Day et al.

(10) Patent No.: US 6,534,575 B2
(45) Date of Patent: *Mar. 18, 2003

(54) PLASTICIZED POLYVINYL CHLORIDE COMPOUND

(76) Inventors: James F. Day, 1116 Crescent Ct., Winston-Salem, NC (US) 27127; James J. Good, 3227 Calvary Ridge Ct., Fredericksburg, VA (US) 22408

(*) Notice: Subject to any disclaimer, the term of this patent is extended or adjusted under 35 U.S.C. 154(b) by 0 days.

This patent is subject to a terminal disclaimer.

(21) Appl. No.: 09/908,722

(22) Filed: Jul. 20, 2001

(65) Prior Publication Data

US 2002/0010242 A1 Jan. 24, 2002

Related U.S. Application Data

(63) Continuation of application No. 09/504,109, filed on Feb. 15, 2000, now Pat. No. 6,337,419, which is a continuation of application No. 08/896,184, filed on Jul. 17, 1997, now Pat. No. 6,114,425.

(51) Int. Cl.[7] ............... C08K 5/12; C09K 21/00; C07C 69/76
(52) U.S. Cl. ............... 524/288; 252/601; 252/608; 560/83; 524/409; 524/439; 524/567
(58) Field of Search ............... 560/83; 252/601, 252/608; 524/288

(56) References Cited

U.S. PATENT DOCUMENTS

| 2,496,852 A | 2/1950 | Bohrer ............... 260/31.8 |
| 2,780,643 A | 2/1957 | Buchner ............... 560/99 |
| 2,805,246 A | 9/1957 | Bourguignon et al. ...... 260/475 |
| 2,862,958 A | 12/1958 | Goreau ............... 260/475 |
| 3,293,282 A | 12/1966 | Farrar et al. ............... 260/475 |
| 3,966,676 A * | 6/1976 | Richter et al. |
| 4,105,710 A | 8/1978 | Thomas et al. ............... 260/869 |
| 4,227,010 A | 10/1980 | Hood ............... 560/77 |
| 4,277,379 A | 7/1981 | Hermann et al. ............... 252/608 |
| 4,284,793 A | 8/1981 | Sagara et al. ............... 560/78 |
| 4,298,517 A | 11/1981 | Sandler ............... 260/31.8 |
| 4,304,925 A | 12/1981 | Watanabe et al. ............... 560/78 |
| 4,376,837 A | 3/1983 | Jenker et al. ............... 524/108 |
| 4,394,471 A | 7/1983 | Keogh ............... 524/92 |
| 4,397,977 A | 8/1983 | Sandler ............... 524/288 |
| 4,552,911 A | 11/1985 | Cohnen et al. ............... 524/94 |
| 4,659,381 A | 4/1987 | Walters ............... 106/18.16 |
| 4,740,537 A | 4/1988 | Silver ............... 523/200 |
| 4,754,053 A | 6/1988 | Mamuzic et al. ............... 560/78 |
| 4,912,158 A | 3/1990 | Bohen et al. ............... 524/288 |
| 5,008,323 A | 4/1991 | Favstritsky et al. ............... 524/469 |
| 5,036,121 A | 7/1991 | Coaker et al. ............... 524/100 |
| 5,049,697 A | 9/1991 | Bohren et al. ............... 560/83 |
| 5,114,786 A | 5/1992 | Louis ............... 428/270 |
| 5,208,366 A | 5/1993 | Bohen et al. ............... 560/83 |
| 5,395,874 A | 3/1995 | Mishima et al. ............... 524/409 |
| 5,728,323 A | 3/1998 | Day et al. ............... 252/601 |
| 6,114,425 A | 9/2000 | Day et al. ............... 524/288 |
| 6,232,427 B1 | 9/2001 | Buono et al. ............... 528/147 |

FOREIGN PATENT DOCUMENTS

| JP | 5005701 | 3/1975 | ........... C07C/69/80 |
| JP | 6220264 | 8/1994 | |
| WO | WW8803542 | 5/1988 | |

OTHER PUBLICATIONS

United States Statutory Invention Registration No. H579; published, Feb. 7, 1989 by Fidelle et al., entitled "Highly Flame Retarded Flexible Polyvinyl Chloride Compositions and Method for Producing Same".

Weissermel, Klaus and Hans–Jurgen, Arpe, Industrial Organic Chemistry, Second, Revised and Extended Edition, translated by Lindley, Charlet R., 1993; pp. 132–134, 206–208.

* cited by examiner

Primary Examiner—Johann Richter
Assistant Examiner—Paul A. Zucker
(74) Attorney, Agent, or Firm—Roylance, Abrams, Berdo & Goodman, L.L.P.

(57) ABSTRACT

A highly flame retardant plasticized polyvinyl chloride compound (PVC) comprises a mixture of dialkyl tetrachlorophthalate and dialkyl tetrabromophthalate and is characterized by an absence of brittleness, and substantial flexibility at low temperatures as required for PVC formed jackets and insulation for wire and cable products.

12 Claims, No Drawings

PLASTICIZED POLYVINYL CHLORIDE COMPOUND

This application is a continuation of application Ser. No. 09/504,109, filed Feb. 15, 2000, now U.S. Pat. No. 6,337,419, which is a continuation of application Ser. No. 08/896,184, filed Jul. 17, 1997, now U.S. Pat. No. 6,114,425.

BACKGROUND OF THE INVENTION

1. Field of the Invention

This invention relates to a highly flame retardant plasticized polyvinyl chloride compound (PVC) further characterized by an absence of brittleness at low temperatures, and substantial flexibility such as required for PVC formed jackets and insulation for wire and cable products and sheets often used, for example, as roof sheathing upon which shingles or other roof covering is laid.

2. Description of the Related Art

PVC compounds (PVC) are a well known class of thermoplastic polymers which exhibit excellent chemical and corrosion resistance, physical and mechanical strength, and electrical insulative properties. Unplasticized versions of PVC are inherently flame resistant and rigid PVC compounds require only additional antimony trioxide to achieve a high level of flame retardancy. However, when flexible forms of PVC are required, the addition of plasticizers result in increased flammability of PVC. Conventional PVC is also apt to produce excessive smoke when ignited.

Both triaryl and diaryl alkyl phosphate esters have been used to improve the flame retardancy of PVC. High flame retardant demands for more stringent flexible PVC applications, such as outer jackets and insulators for plenum wires and cables, for sheets used in the construction industry, for example, as roof sheathing upon which shingles or other roof coverings are laid, as well as for flexible coatings applied to fabrics, have required improvements in the flame retardant plasticizers incorporated in these compounds. The additional of dialkyl tetrahalophthalates such as dioctyl tetrabromophthalate or di-2-ethylhexyltetrabromophthalate have been able to achieve exceptional thermal stability with exceptional flame retardancy. However, the low temperature flexibility of PVC compounds is compromised with the addition of such compounds.

It is known that flame retardant synergy is exhibited by certain brominated and chlorinated compounds. (By use of the term "flame retardant synergy" it is meant that the action of two or more substances achieve an effect of which each is individually incapable.) For example, a paper entitled *Bromine-Chlorine Synergy To Flame Retard ABS Resins*, by Seunghee Yun and Hyunkoo Kim of Miwon Petrochemical Corporation, presented at the New Developments and Future Trends in Fire Safety On A Global Basis International Conference, March 1997, discusses mixtures of DECHLORANE™ PLUS, a product of Occidental Chemical Corporation, and TBBA (Tetrabromobisphenol A), or FF-680 (Bis(Tribromophenoxy)Ethane) to produce acrylonitrile butadiene styrene (ABS) resins having improved flame retardant characteristics. However, the Yun and Kim results refer to ABS, a rigid plastic used in electrical component housings (e.g. TV cabinets and computer casings). Yun and Kim use the chlorinated substance Dechlorane Plus to increase the rigidity of the resultant ABS. Such rigidity would be a serious flaw in PVC formed jackets and insulation for wire and cable products. Improvement of flame retardant properties, as well as improvement of low temperature flexibility and decreased smoke generation, has not heretofore been known when the type of brominated and chlorinated compounds of the present invention are used in PVC compounds. The principal object of the present invention, therefore, is to provide a highly flame retardant plasticized PVC based on the discovery that improved low temperature flexibility can be achieved by adding to PVC dialkyl tetrahalophthalate mixtures of the type hereafter described.

Dialkyl tetrahalophthalates are produced from the reaction of tetrachlorophthalic acid or anhydride and/or tetrabromophthalic acid or anhydride with $C_1$–$C_{18}$ alkanols. The production of dialkyl tetrabromophthalate and dialkyl tetrachlorophthalates is well known in the field. Numerous processes have been described for the preparation of dialkyl phthalates by esterification of various alcohols with phthalic anhydride or acid in the presence of acidic catalysts, such as sulfuric acid, phosphoric acid, toluene sulfonic acid, and methane sulfonic acid. For example, Spatz et al. (I & EC Product Res. and Dev. 8: 391, 1969) discloses the preparation of di-2-ethylhexyl tetrabromophthalate using phosphoric acid catalysis. Nomura et al. (published Japanese Patent Application No. 50-05701, 1975) describes the use of tetraalkyl titanates in the presence of alkali metal salt to prepare dialkyl tetrabromophthalates. Sagara et al. (U.S. Pat. No. 4,284,793) discloses a method for producing plasticizers with low residual titanium, in which phthalic anhydride is reacted with an alcohol in the presence of a titanate catalyst. The resultant ester is treated with a solid alkali, such as sodium carbonate, and adsorbing agent(s) in the absence of water. Watanable et al. (U.S. Pat. No. 4,304,925) discloses a process for purifying esters, such as those formed from phthalic anhydride and ethyl hexyl alcohol, when organotitanium compounds are used as catalysts, where water is added to the esterification mixture and the mixture is heated. Mamuzic et al. (U.S. Pat. No. 4,754,053) discloses the preparation of tetrabromophthalate diesters using sodium carbonate decahydrate as an essential part of the process. Bohen et al. (U.S. Pat. Nos. 5,049,697 and 5,208,366) disclosed a process for the preparation of dialkyl esters of polyhaloaromatic acids catalyzed by the use of various organometallic catalysts, such as organotitanates, as well as organo-tin, antimony and zirconium compounds. However, these patents do not disclose nor suggest mixing tetrabromophthalate and tetrachlorophthalate for the purpose of improving low temperature flexibility of PVC.

Accordingly, the primary object of this invention is to improve the low temperature flexibility of highly flame retardant plasticized PVC compounds by incorporating into PVC, according to the discovery of the invention, dialkyl tetrahalophthalate mixtures containing both tetrabromophthalates and tetrachlorophthalates.

A further object of this invention is to decrease the smoke generation character of PVC.

Another object is to provide an improved PVC approved for use in products such as insulation, jackets, coatings, and sheeting.

Other objects and advantages will be more fully apparent from the following disclosure and claims.

SUMMARY OF THE INVENTION

The subject of this invention is to improve the low temperature flexibility of highly flame retardant plasticized PVC compounds by incorporating into PVC dialkyl tetrahalophthalate mixtures containing both tetrabromophthalates and tetrachlorophthalates. PVC containing tetrabromophthalate and tetrachlorophthalate mixtures show significant improvements in their low temperature flexibility. PVC compounds of the present invention also result in synergist improvements of flame retardancy with decreased smoke generation.

DETAILED DESCRIPTION OF THE INVENTION AND PREFERRED EMBODIMENTS THEREOF

The principal object of this invention as previously stated is to improve the low temperature flexibility of highly flame retardant plasticized PVC by the addition of dialkyl tetrahalophthalate mixtures. Preferably the dialkyl tetrahalophthalates used in the PVC compound of the present invention are prepared in accordance with the teachings of the separately filed co-pending patent application Ser. No. 08/554,262, which disclosed a new method for preparing nearly colorless, highly pure, tetrahalophthalates with an extremely low acid number. However, it is recognized that the dialkyl tetrahalophthalates used in the PVC compound of the present invention may be prepared using methods already known in the art. When tetrahalophthalate compounds are made according to the method described in the '262 application, certain improved characteristics of PVC useful to the present inventions are achieved. The method for preparing dialkyl tetrahalophthalates as taught by the '262 application is utilized by the present invention to produce the brominated and chlorinated compounds which are incorporated into the PVC of the present invention resulting in an improved low temperature flexibility characteristic. This method of the '262 application is described next.

I. Preparation of Dialkyl Tetrahalophthalates

The preferred method as taught in the '262 application for preparing dialkyl tetrahalophthalates used in the present invention utilizes a tetrahalophthalic compound selected from the group consisting of tetrahalophthalic anhydrides and tetrahalophthalic acids. The tetrahalophthalic anhydride or acid used may be of tetrabromo- or tetrachloro-substitution on the aromatic ring, with tetrabromophthalic anhydride the preferred embodiment The tetrahalophthalic compound is reacted with an excess of alkanol, as is known in the art, to form a reaction mass. The alkanol is selected from $C_1$ to $C_{18}$ alkanols, or a mixture thereof. The alkanol may be a $C_1$ to $C_{18}$ primary or secondary alkanol with linear or branched alkyl moieties. The preferred alkanols are 2-ethylhexanol and 3,3,5-trimethylhexanol, as well as mixtures of $C_8$ to $C_{15}$ alkanols resultant from Oxo- and Ziegler manufacturing processes as known in the art (see Weissermel, K. and Arpe, H–J., *Industrial Organic Chemistry*, pages 132–134, 206–208, VCH Publishers, New York, 1978).

The tetrahalophthalic anhydride may contain up to 0.30% residual sulfuric acid. Residual sulfuric acid resultant from the preparation of the original tetrahalophthalic anhydride is removed by serial hot water washing or preferably by the neutralization with a first Group II alkaline earth metal salt, more preferably a Group II alkaline earth metal salt of a lower carbon chain acid, and most preferably magnesium or calcium acetate. This treatment must be done before esterification to achieve low product color. Lower carbon chain acids of the type identified herein are carbon chains containing approximately four or less carbons. If hot water is used (about 90° C.), typically 3–4, 300-ml aliquots of water (usually about 1 part water to 2 parts anhydride+alkanol) have been found to be sufficient to remove the residual sulfuric acid in the aqueous phase to less than 0.1%, when a mole of anhydride is using in the starting reaction mix. If less water is used, more washes are generally required to achieve the results of the invention. The water wash treatment, while being effective, is substantially more time-consuming than adding a Group II alkaline earth metal salt, which is the preferred treatment.

Preferably, treatment first with a Group II alkaline earth metal salt (first Group II alkaline earth metal salt) is used instead of a water wash to remove acidity. A weak base is preferred, such as magnesium acetate, to neutralize the acid. Alternatively, calcium acetate may be used. Use of an acetate ensures that the pH will be less than 7.0 which is critical because the titanium catalyst is sensitive to, and is destroyed by, alkaline pH. The first Group II alkaline earth metal salt is used at 0.01 to 10 percent of the weight of the reaction mass (defined as the weight of the original reactants, preferably at 0.1 to 0.5 weight percent, most preferably at stoichiometric levels equal to that of the residual sulfuric acid in the tetrahalophthalic anhydride.

The solution which has been water washed or treated with a first Group II alkaline earth metal salt is dried by azeotroping out the water to a content of less than 0.05% by means known in the art. The product is then esterified with a neutral catalyst which may be an alkyl titanate catalyst or zirconium tetrabutoxide. An alkyl titanate catalyst is normally used in the industry. The esterification catalyst is a $C_1$ to $C_{18}$ tetraalkyl titanate, preferably a $C_8$ to $C_{18}$ tetraalkyl titanate, which most preferably is an alkyl identical to that of the alkanol esterified into the product, thereby limiting the preparation of mixed esters due to the transesterification of the alkyl groups of the catalyst into the product.

In another important step, the residual acidity from the reaction is removed by the addition of 0.1 to 20 percent of a second Group II alkaline earth metal salt, such as magnesium silicate (Magnesol$^R$ from the Dallas Group) or calcium silicate, plus an equal weight of water. This step is done after esterification; otherwise, the tetrahalo anhydride would be unnecessarily treated, which would consume raw material needlessly. Magnesium silicate makes the salts of titanium insoluble so that more of the turbidity-causing titanium drops out of the solution. Although magnesium or calcium oxide, or magnesium or calcium hydroxide, may be used at an equal weight percent basis as the magnesium silicate, there is a resultant decrease in filtration rates. Use of Group I alkalis, other than lithium hydroxide and lithium silicate is not desirable because of their alkalinity (loss of product yield with poor filtration), and some metal contamination (Lithium and titanium) occurs with the lithium alkalis.

The addition of the water in the step discussed above is essential for the neutralization of the residual acidity by the magnesium silicate. Further, the water neutralzes the residual unreacted monoester intermediate. Water acts as a phase transfer agent. Magnesium silicate is a powder. The reaction conditions are 50–95° C., preferably 90° C. for 1 to 4 hours after which the water of the neutralization is removed by vacuum distillation at 90–140° C. This drying technique is essential to driving the neutralization to completion as well as the formation of a granular precipitant which is easily removed with conventional filtration methods, such as vacuum or pressure filtration. The final product of the invention can be washed again with lithium hydroxide if it is desired to increase the product purity and assure the minimum level of acidity.

The treatment with magnesium silicate decreases product color 1 to 5 Gardner color units (A.O.C.S. Method Td 12-64T) as compared to 5–15 Gardner color units when the treatment with magnesium silicate is not utilized. This treatment essentially removes all residual titanium, thus producing a haze-free product even at low temperatures.

These Group II alkaline earth metal silicates are particular advantageous since filter aids, such as diatomaceous earth, are not required and the Group II alkaline earth metal silicate absorbs only small quantities of finished product, thereby improving product yield.

Products prepared according to the described method have a purity of 93–95.5%, with an average of 95–95.5%, whereas prior methodologies at their best have only reached a purity of about 93%.

The Gardner color units of the final product are decreased to about 10 without the water wash or magnesium acetate treatment but with the magnesium silicate (as compared to about 15 without either treatment). The water wash or the magnesium acetate treatment plus the magnesium silicate treatment decreases the Gardner color units to about 1–2.

The features and advantages of the described method of the '262 application as applied to the present invention will be more clearly understood by reference to the following examples, which are not to be construed as limiting to the present invention.

EXAMPLES

Example I

1. Tetrabromophthalic anhydride (464 grams), which typically contains 0.08–0.15% sulfuric acid, is dissolved in 2-ethylhexanol (390 grams) at 90° C. as is known in the art.
2. The solution is serially washed with aliquots of 300 grams of hot water at 90° C. until the residual sulfuric acid in the aqueous phase is less than 0.1%.
3. The solution is dried by azeotroping out water at 160–190° C. until the water content is less than 0.05%.
4. The reaction mass is esterified at 195–205° C. in a 1 liter reaction flask equipped with a Dean-Stark trap, with a catalytic quantity of tetra-2-ethylhexyl titanate (6 grams) until residual acid values are less than 0.5 meq/100 grams sample. The total esterification time is less than 6 hours.
5. The excess 2-ethylhexanol is distilled off under vacuum, further reducing the residual acidity to less than 0.2 meq/100 grams sample.
6. The reaction mass is cooled to 90° C. and treated with 7 grams magnesium silicate and 7 grams water, each of which is slurried into the reaction mass with mixing. The amount of water preferred is 1–2 times that of magnesium silicate (at 0.1 to 20 weight percent). The acid value is checked before filtration (next step) to be sure that it is low.
7. After treatment the reaction mass is dried under vacuum to less than 0.05% water and vacuum-filtered hot with a Buchner funnel as known in the art. The resulting product (692 grams) has the following properties:

Appearance: Clear, slightly yellow liquid with no haze
Gardner Color: <1
Acidity: <0.001 meq/100 gram sample (ASTM D 1613-91)
GC Purity: 97.4%
Residual Titanium: <0.1 ppm (lower detection limit)
Residual Magnesium: <0.1 ppm (lower detection limit)

Example II

The serial water washing of Example I (step 2) is replaced with the addition of 1.5 grams magnesium acetate. The resultant product is nearly colorless with equal product quality properties and yield as in Example 1.

Example III

The 2-ethylhexanol of Examples I or II is replaced with a mixture of straight and branched chain alcohols (480 grams) with nine to eleven carbons (e.g., Neodol 91 manufactured by Shell Chemical Company). The resultant product quality is comparable to the results of Examples I and II with a product yield of 750 grams. Product purity was slightly lower due to the mixed esters produced from the transesterification of the alkyl groups of the catalyst.

Example IV

The 2-ethylhexanol of Examples I or II is replaced with 432 grams of 3,3,5-trimethyhexanol (also known as isononyl alcohol). The resultant product quality is comparable to the above examples with a product yield of 719 grams. Product purity is slightly lower due to the mixed esters produced from the transesterification of the alkyl groups of the catalyst.

Example V

The 2-ethylhexanol of Examples I or II is replaced with a mixture of straight and branched chain alcohols (516 grams) with eleven carbons (comparable to Neodol 1 manufactured by Shell Chemical or Lial 111 manufactured by EniChem). The resultant product quality is comparable to the above examples with a product yield of 774 grams. Product purity is slightly lower due to the mixed esters produced from the transesterification of the alkyl groups of the catalyst.

Example VI

The 2-ethylhexanol of Examples I or II is replaced with a isodecyl alcohol (comparable to Exxal 10 manufactured by Exxon Chemical)(474 grams). The resultant product quality is comparable to the above examples with a product yield of 764 grams. Product purity is slightly lower due to the mixed esters produced from the transesterification of the alkyl groups of the catalyst.

Example VII

The 2-ethylhexanol of Examples I or II is replaced with isotridecyl alcohol (comparable to Exxal 13 manufactured by Exxon Chemical)(600 grams). The resultant product quality is comparable to the above examples with a product yield of 828 grams. Product purity is slightly lower due to the mixed esters produced from the transesterification of the alkyl groups of the catalyst.

Example VIII

The 2-ethylhexanol of Examples I or II is replaced with n-octanol (comparable to Alfol 8 manufactured by Vista Chemical or Epal 8 manufactured by Amoco)(390 grams). The resultant product quality is comparable to the above examples with a product yield of 695 grams. Product purity is slightly lower due to the mixed esters produced from the transesterification of the alkyl groups of the catalyst.

From the above it can be seen how nearly colorless, highly pure, dialkyl tetrahalophthalates with an extremely low acid number were prepared according to the '262 application. The description next proceeds to describing how plasticized PVC compounds of the present invention are prepared.

II. Preparation of Plasticized PVC Compounds

In the present invention, dialkyl tetrachlorophthalate and dialkyl tetrabromophthalate are first individually prepared in accordance with the above described method. Following which, in accordance with the present invention, the dialkyl tetrachlorophthalate-dialkyl tetrabromophthalate mixture can be prepared in any of a number of ways. For example, the two tetrahalophthalate products may be prepared separately and then mixed until a homogeneous one phase fluid is obtained. The two products may also be synthesized simultaneously. The mixtures can be prepared by synthesizing separately or together, by mixing the appropriate molar ratio of tetrachlorophthalic and tetrabromophthalic anhydrides with the $C_{1-18}$ alkanol in a reaction flask as described in detail above. As is well known in the arts, flame retardants must be in liquid form to plasticize PVC. See, *Handbook of Polyvinyl Chloride Formulating,* edited by Edward J. Wickson, 818–831, John Wiley & Sons (1993). The disclosure of this publication and all other publications and patents referred to herein are incorporated herein by reference.

The tetrahalophthalate mixture is then added and mixed with PVC, a flame retardancy synergist such as antimony trioxide, a plasticizer such as trioctyl trimellitate, and a lead stabilizer which are compounded into a flexible thermoplastic polymer, such as PVC for use on plenum wire and cable applications, where low-temperature flexibility is a desired PVC attribute. The dialkyl tetrahalophthalate mixtures can comprise dialkyl tetrachlorophthalate to dialkyl tetrabromophthalate of 1–99% to 99–1% by weight. However, the ratio of these two halophthalates is preferably 1–50% dialkyl tetrachlorophthalate to dialkyl tetrabromophthalate, but 25–33% dialkyl tetrachlorophthalate to dialkyl tetrabromophthalate is most preferred.

EXAMPLES

For Examples A, B, and C below, composition components (base PVC polymer, plasticizer, stabilizer, flame retardant synergist, and the dialkyl tetrahalophthalate mixture) were combined and thoroughly mixed. Initial mixing of the ingredients was done in a blender. The resulting charge was transferred to a 2 roll mill and preheated to 350° F. for fusion and further mixing. Rolling time was for 5 minutes under 1260 psi compression at 337° F. for compression molding of the mixture into test sheets. The standard for PVC compression molding as known in the art is fully described in ASTM Designation: D-1928-90 and ASTM D-746. ASTM D-1928-90 and ASTM D-746 disclose the standard for preparing compression molded polyethylene test sheets and is also the standard for PVC compression molding of the mixture into test specimens which, in this case, were subjected to physical, mechanical, and flame retardancy testing as described in Examples A, B, and C below.

Each Example includes tests to determine the tensile properties of the compressed PVC using standard dumbbell-shaped test specimens. The standard test method for testing tensile properties is found in the ASTM Designation D-638, published in 1995. In summary, the test specimen is clamped by and between grips. The grips extend in opposed directions thereby stretching the test specimens until the specimen breaks. The test specimens' tensile properties that were measured were: (1) Tensile Modulus, which is the ratio of stress to corresponding strain below the proportional limit of a material, expressed in force per unit area; (2) Tensile Strength at Break, which is the maximum tensile stress (tensile load per unit area of minimum original cross section) sustained by the specimen during a tension test at specimen break; and (3) Elongation, which is the elongation of a test specimen expressed as a percent of the gage length. An increase in these test factors indicates a more flexible test specimen.

Test specimen hardness was also measured. The standard hardness test method is found in the ASTM D-2240, published in 1995. In summary, the test method results are based on the penetration of a indentor when forced into the test specimen.

Flame retardancy of the control and test formulations were determined by the Designation ASTM D-2863, published in 1995, to give oxygen index values. The oxygen index is equal to the minimum concentration of oxygen, expressed as volume percent, in a mixture of oxygen and nitrogen that will just support flaming combustion of a material initially at room temperature. An higher oxygen index indicates higher flame retardancy.

The test specimens were tested for the density of smoke generated by burning the test specimens in an NBS Smoke Chamber using the flaming mode in accordance with the ASTM E662-95 publication.

The test specimens were also tested for Brittleness Temperature. Brittleness temperature is the temperature at which 50% for the specimens probably would fail. The brittleness of a test specimen is determined by immersing the specimen in a bath containing a heat transfer medium that is cooled. The specimens are struck at striking element at specified linear speed and then examined. The brittleness temperature is the temperature at which 50% of the specimens fail.

Example A

PVC resin (the base PVC resin used was GEON 30, a product of the GEON COMPANY) was compounded in a 2 roll mill in accordance with the procedures disclosed in ASTM D-1928 using the below mentioned Control and Test Formulations. The quantities of components are indicated in parts by weight per hundred parts by weight resin.

| | Formulations | |
| --- | --- | --- |
| COMPONENT | CONTROL FORMULATION Parts per Hundred Resin (PHR) | TEST FORMULATION Parts per Hundred Resin (PHR) |
| PVC Resin (Geon 30) | 100 | 100 |
| Antimony Trioxide | 15 | 15 |
| Trioctyl Trimellitate (UNIPLEX ™ 546-A) | 34.3 | 34.3 |
| Lead Stabilizer | 5 | 5 |
| Dioctyl Tetrabromophthalate (UNIPLEX ™ FRP-45) | 40 | 30 |
| Dioctyl Tetrachlorophthalate (UNIPLEX ™ FRP-27) | 0 | 10 |

-continued

| TEST PROCEDURE | CONTROL FORMULATION | TEST FORMULATION |
|---|---|---|
| Tensile Modulus at 100% Strain (psi) (ASTM D638-95) | 1760 | 1963 |
| Tensile Strength at Break (ASTM D638-95) | 2050 | 3391 |
| Elongation (%) (ASTM D638-95) | 278 | 370 |
| Shore A Hardness (ASTM D-224095, A Scale) | 88 | 94 |
| Oxygen Index (ASTM D2863-95) | 33 | 37 |
| NBS Smoke (ASTM E662-95) Flaming (Dmc) | 440 | 276 |
| Non-flaming (Dmc) | 180 | 140 |
| Brittleness Temperature Testing, ° C., (ASTM D746-95) | −14 | −25 |

Example B

Dialkyl tetrabromophthalates were prepared from the reaction of LINEVOL™ 91 alcohol (produced by SHELL CHEMICAL, CAS Registry Number is 68603-15-6) with tetrabromophthalic anhydride to produce a di(nonyl/decyl/undecyl) tetrabromophthalate mixture in accordance with the preferred method of producing dialkyl tetrahalophthalates described above. LINEVOL™ 911 is a mixture of nonyl($C_9$), decyl ($C_{10}$), and undecyl ($C_{11}$) alcohols with 75–85% by weight normal alcohols and the remainder being 2-n-alkylisomers, principally 2-methyl. Since tetrahalophthalate anhydride has two reactive acid functions; dialkyl tetrahalophthalates are produced as illustrated immediately below:

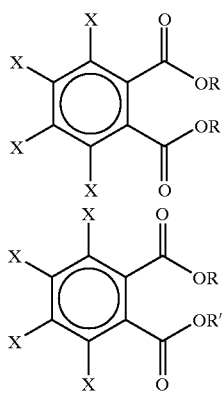

Where R=$C_9$ or $C_{10}$ or $C_{11}$.
Where R'=$C_9$ or $C_{10}$ or $C_{11}$.
Where X=halogen.
Therefore, there are seven different diesters possible where the alkanol carbon chain lengths are:
di $C_9$, $C_9C_{10}$, $C_9C_{11}$
di $C_{10}$, $C_{10}C_{11}$
di $C_{11}$, $C_{11}$, $C_9$ In this case, the resultant brominated diesters were mixed with the dioctyl tetrachlorophthalate, preferably prepared in accordance with the method for producing dialkyl tetrahalophthalates described above, at room temperature until a homogeneous one phase liquid mixture was produced. The tetrahalophthalate mixture was then compounded into PVC as previously described and as is well known in the art.

| | Formulations: | |
|---|---|---|
| COMPONENT | CONTROL FORMULATION Parts per Hundred Resin (PHR) | TEST FORMULATION Parts per Hundred Resin (PHR) |
| PVC Resin (Geon 30) | 100 | 100 |
| Antimony Trioxide | 15 | 15 |
| Trioctyl Trimellitate (UNIPLEX ™ 546-A) | 34.3 | 34.3 |
| Lead Stabilizer | 5 | 5 |
| Di(nonyl/decyl/undecyl) Tetrabromophthalate | 40 | 30 |
| Dioctyl Tetrachlorophthalate (UNIPLEX ™ FRP-27) | 0 | 10 |

| TEST PROCEDURE | CONTROL FORMULATION | TEST FORMULATION |
|---|---|---|
| Tensile Modulus at 100% Strain (psi) (ASTM D638-95) | 1800 | 1960 |
| Tensile Strength at Break (ASTM D638-95) | 2010 | 3410 |
| Elongation (%) (ASTM D638-95) | 284 | 385 |
| Shore A Hardness (ASTM D-224095, A Scale) | 88 | 94 |
| Oxygen Index (ASTM D2863-95) | 33 | 37 |
| NBS Smoke (ASTM E662-95) Flaming (Dmc) | 460 | 284 |
| Non-flaming (Dmc) | 200 | 140 |
| Brittleness Temperature Testing, ° C., (ASTM D746-95) | −21 | −34 |

UNIPLEX is a trade name for the named compound owned by Unitex Chemical Corporation.

Example C

PVC resin (Geon 30 from the Geon Company was compounded in a 2 roll mill by ASTM D 746 using the below mentioned formulations.

| COMPONENT | PARTS PER HUNDRED RESIN (PHR) | PARTS PER HUNDRED RESIN (PHR) |
|---|---|---|
| PVC Resin (Geon 30) | 100 | 100 |
| Antimony Trioxide | 15 | 15 |
| Trioctyl Trimellitate (Uniplex 546-A) | 34.3 | 34.3 |
| Lead Stabilizer | 5 | 5 |
| Dioctyl Tetrabromophthalate (Uniplex FRP-45) | 20 | 10 |
| Dioctyl Tetrachlorophthalate (Uniplex FRP-27) | 20 | 30 |

The resultant resin was compression molded into test specimens and subject to physical, mechanical, and flame retardancy testing. The results are shown in the table below:

| TEST PROCEDURE | PARTS PER HUNDRED RESIN (PHR) | PARTS PER HUNDRED RESIN (PHR) |
|---|---|---|
| Tensile Modulus at 100% Strain (psi) (ASTM D638-95) | 2050 | 2180 |
| Tensile Strength at Break (ASTM D638-95) | 3450 | 3560 |
| Elongation (%) (ASTM D638-95) | 385 | 390 |
| Shore A Hardness (ASTM D-224095, A Scale) | 94 | 94 |
| Oxygen Index (ASTM D2863-95) | 41 | 44 |
| NBS Smoke (ASTM E662-95) Flaming (Dmc) | 270 | 220 |
| Non-flaming (Dmc) | 130 | 110 |
| Brittleness Temperature Testing, ° C., (ASTM D746-95) | −28 −28 | −32 −32 |

As illustrated by the Examples A, B, and C for the preparation of the plasticized PVC of the present invention, PVC mixtures of tetrabromophthalates and tetrachlorophthalates can be used to form highly flame retardant plasticized PVC with improved low temperature flexibility. As a related discovery, it has also been found that PVC of the present invention also result in less than normal smoke generation when ignited.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A polymer composition comprising:
   a PVC polymer; and
   a tetrahalophthalate mixture comprising a tetrabromophthalate and a tetrachlorophthalate.

2. The composition according to claim 1 further comprising antimony trioxide.

3. The composition according to claim 1 further comprising trioctyl trimellitate.

4. The composition according to claim 1 further comprising a lead stabilizer.

5. The composition according to claim 1 wherein said tetrahalophthalate mixture comprises a weight ratio of dialkyl tetrachlorophthalate to dialkyl tetrabromophthalate within the range of 1–99%.

6. The composition according to claim 1 wherein said tetrahalophthalate mixture comprises a weight ratio of dialkyl tetrachlorophthalate to dialkyl tetrabromophthalate within the range of 1–50%.

7. The composition according to claim 1 wherein said tetrahalophthalate mixture comprises a weight ratio of dialkyl tetrachlorophthalate to dialkyl tetrabromophthalate within the range of 25–33%.

8. The composition of claim 1 wherein the tetrabromophthalate comprises dioctyl tetrabromophthalate.

9. The composition of claim 1 wherein the tetrachlorophthalate comprises dioctyl tetrachlorophthalate.

10. The composition of claim 1 wherein the tetrabromophthalate is a mixture of dialkyl tetrabromophthalates.

11. The composition of claim 10 wherein the tetrabromophthalate comprises a di(nonyl/decyl/undecyl) tetrabromophthalate mixture.

12. The composition of claim 1 wherein said tetrahalphthalate mixture is formed by mixing at room temperature until homogeneous.

* * * * *